Jan. 29, 1952     C. E. THOMPSON     2,583,905
PARACHUTE PACK AND CONTAINER
Filed Aug. 25, 1949                            5 Sheets-Sheet 3
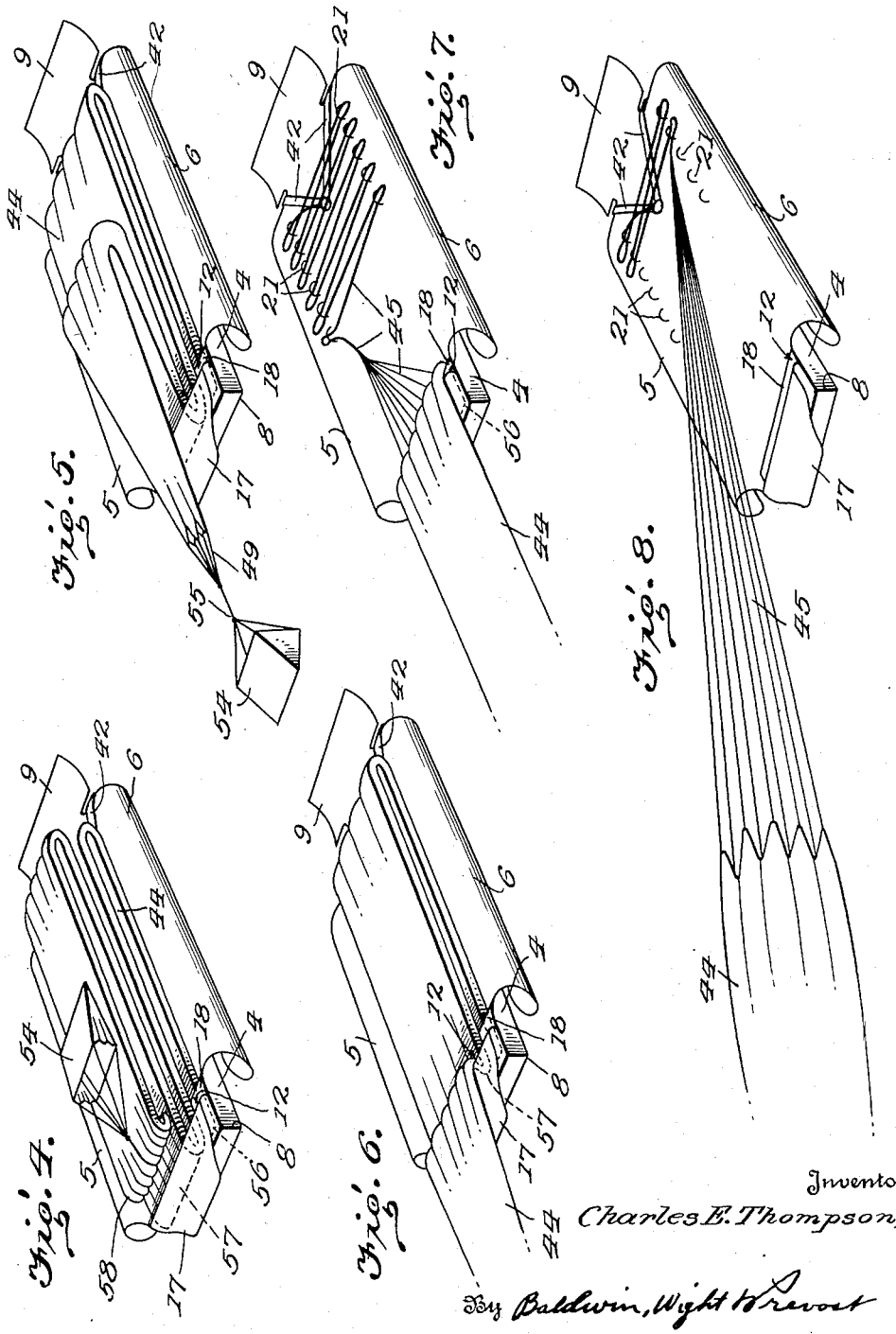

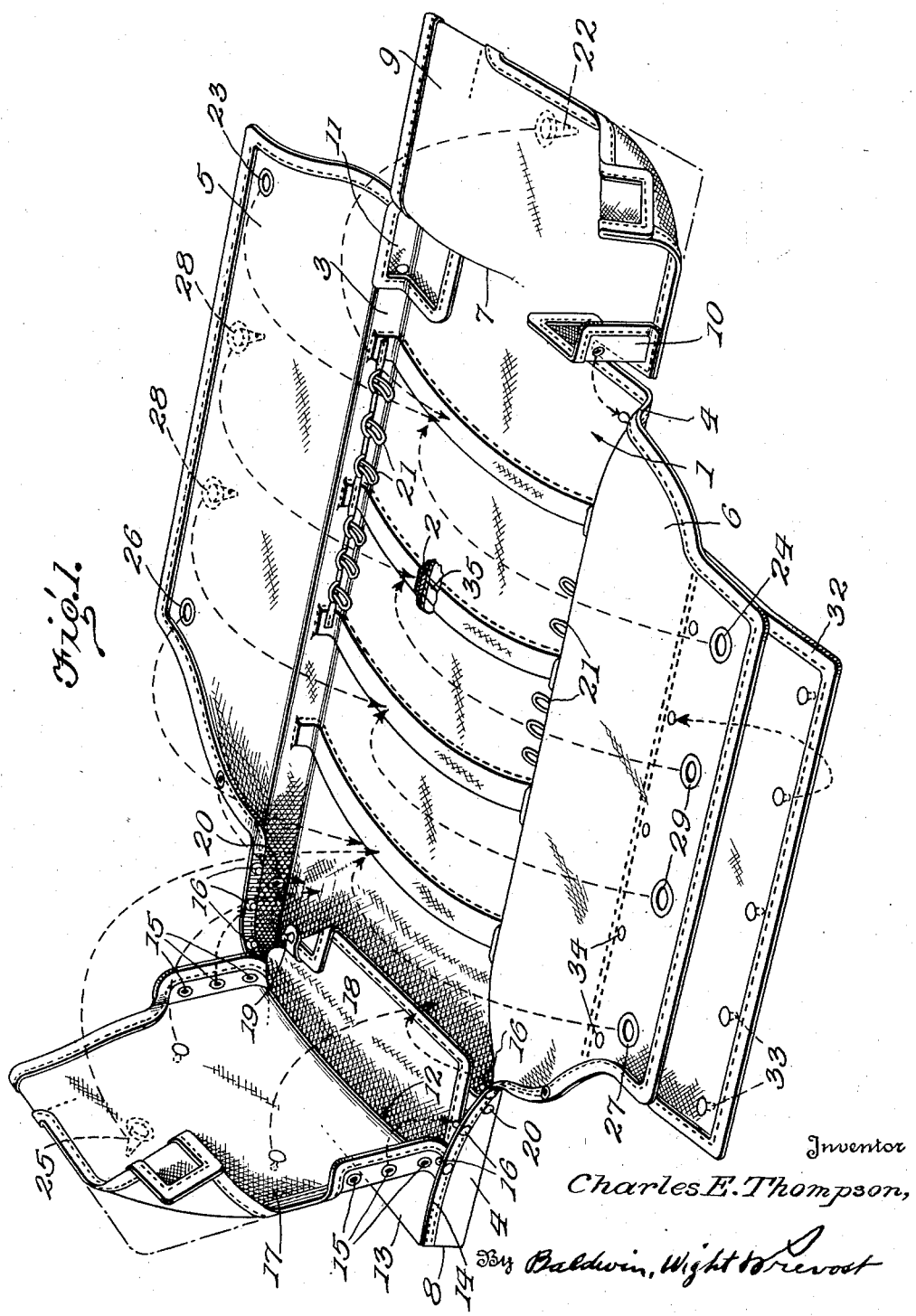

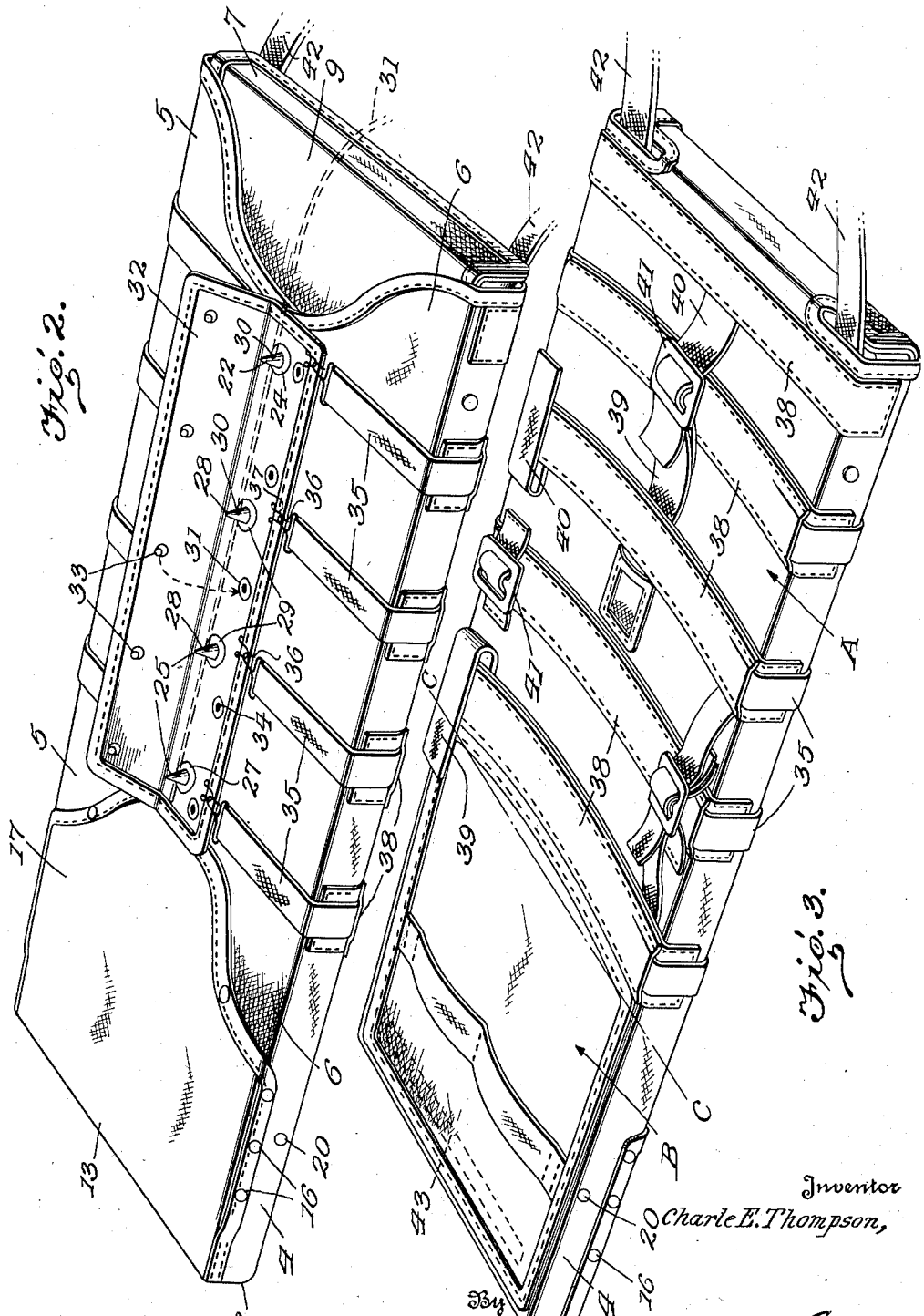

Jan. 29, 1952 — C. E. THOMPSON — 2,583,905
PARACHUTE PACK AND CONTAINER
Filed Aug. 25, 1949 — 5 Sheets-Sheet 4
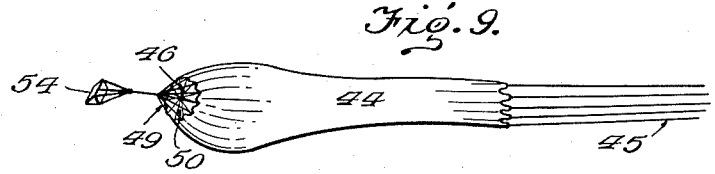
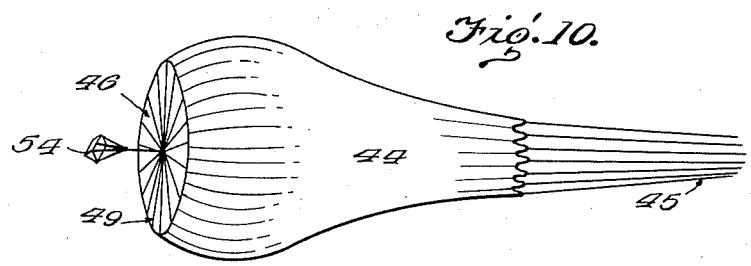
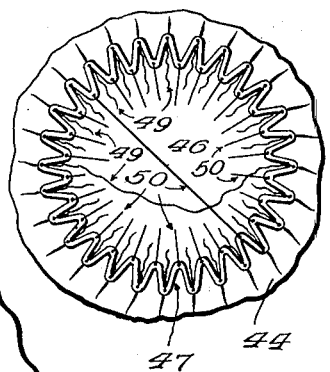
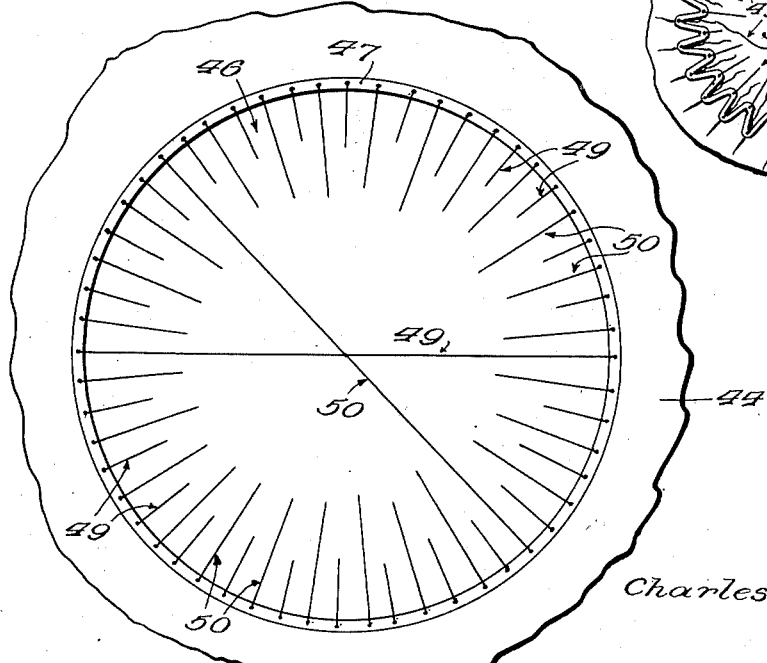
Inventor
Charles E. Thompson,
By Baldwin, Wight & Brevoort
Attorneys Jan. 29, 1952 — C. E. THOMPSON — 2,583,905
PARACHUTE PACK AND CONTAINER
Filed Aug. 25, 1949 — 5 Sheets-Sheet 5
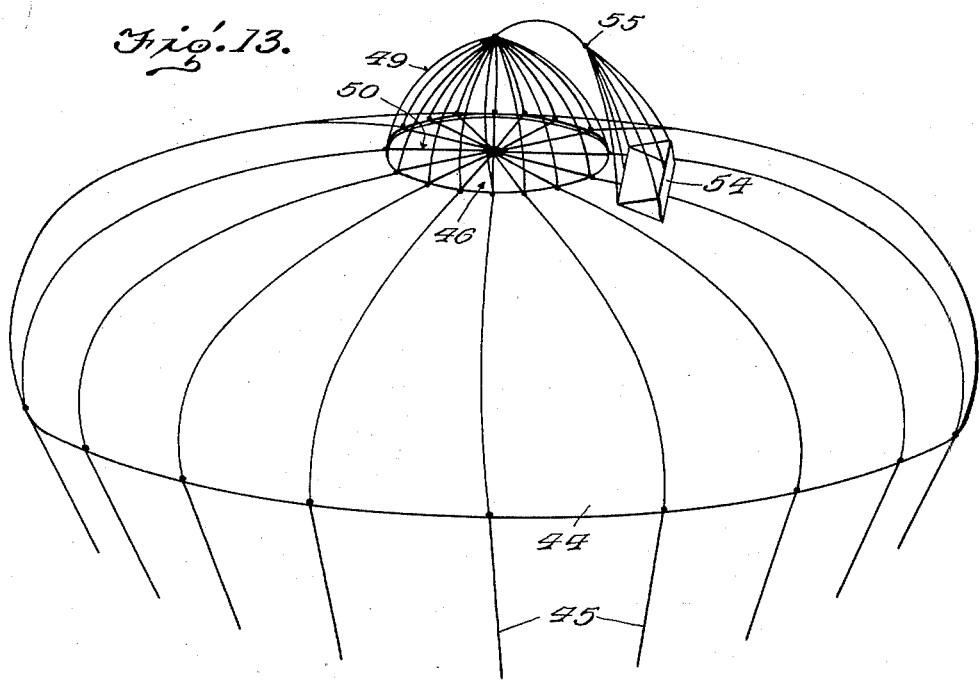
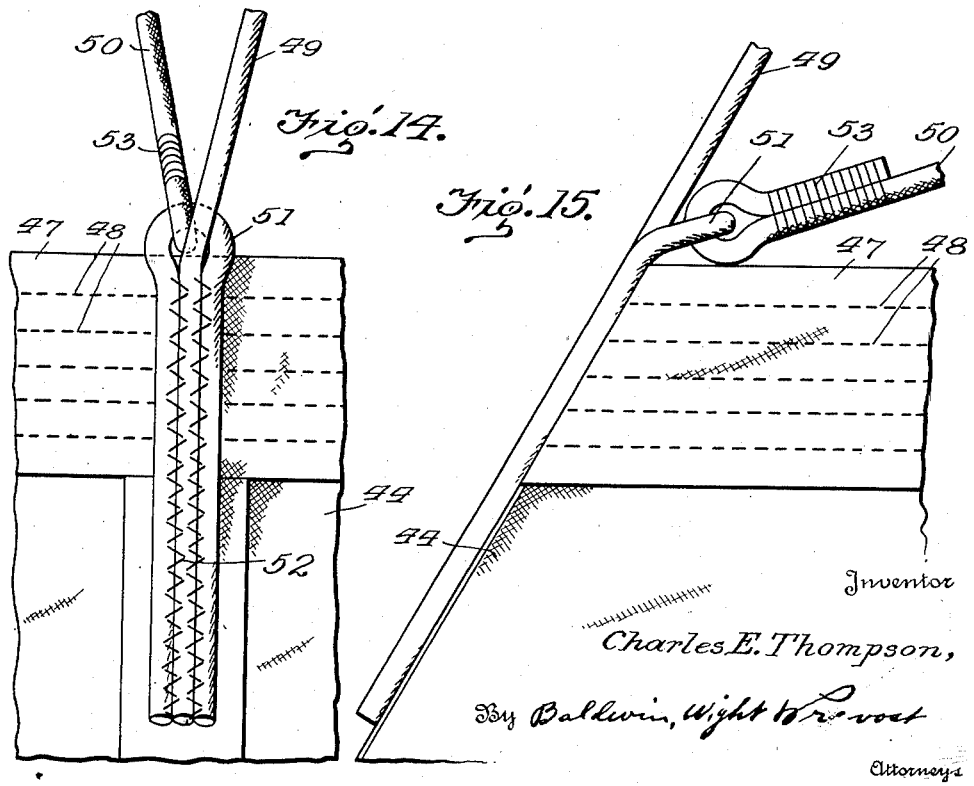

Patented Jan. 29, 1952

2,583,905

UNITED STATES PATENT OFFICE 2,583,905

PARACHUTE PACK AND CONTAINER

Charles E. Thompson, Great Falls, Mont., assignor, by mesne assignments, to Pacific Parachute Company, Inc., a corporation Application August 25, 1949, Serial No. 112,213

4 Claims. (Cl. 244—148)

My invention consists in new and useful improvements in a combined seat and parachute pack container and a parachute associated therewith, for use by aircraft pilots and passengers and while my improved equipment may be used with equal effect in connection with both slow and high speed aircraft, it is primarily designed to meet the conditions prevailing during flight at extremely high speeds.

The primary object of my invention is to provide equipment of this nature designed to control the opening sequence of the parachute, so as to prevent the entrance of air into the canopy until the latter is completely stretched out and the shroud lines begin to leave their retainers.

Another object of the invention is to provide a combined seat and pack container which affords greater comfort to the wearer, involves less bulk, and facilitates the packing of the parachute.

A further object of my invention resides in the provision of a canopy retarding pocket which, during the opening process, causes each fold and part of the canopy to be released from the container in an orderly sequence, thus eliminating uneven openings at high speed and insuring a fast but uniform and safe functioning of the canopy. This in turn eliminates friction burns to the shroud lines and canopy on high speed openings. Furthermore, the parachute container is designed to prevent spinning and rotating as it descends.

A still further object of my invention is to provide a canopy for use in connection with my improved container, which is so constructed as to relieve the opening shock by means of an automatically expanding and contracting vent which enables fliers to escape without injury to themselves or to the parachute at much higher speeds than can be accomplished with known parachutes.

Still another object of my invention is to provide a canopy having an automatically expanding and contracting vent by means of which gradual deceleration is achieved, the vent becoming fully expanded upon opening of the canopy to gather air during high speed escape, releasing most of the captured air and thereby reducing the pressures within the canopy so as to provide a gradual deceleration without excessive strain on the flier or the parachute. As the deceleration continues, the pressures within the canopy are reduced and the vent is automatically retracted in diameter until it reaches a normal size and a normal rate of descent is obtained.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views:

Figure 1 is a perspective view showing my improved container in open position with the parachute removed;

Figure 2 is a similar view showing the flaps of the container in closed position;

Figure 3 is a perspective view of the opposite side of the container, which serves as a seat and back rest for the wearer;

Figures 4 to 10 inclusive, respectively show the opening sequence of a parachute embodying my invention;

Figures 11 and 12 are fragmentary plan views showing the vent of my improved parachute canopy, respectively, in fully retracted and fully extended positions;

Figure 13 is a view of the parachute fully opened with the vent in its normal retracted position; and Figures 14 and 15 are enlarged detail views showing one method of securing the suspension lines and shock cords to the hem of the parachute vent.

Referring first to Figures 1 to 3 of the drawings, my improved container comprises an elongated, relatively shallow body portion 1, preferably composed of sturdy canvas or other suitable material, the upper area A of which is transversely reinforced by a series of longitudinally spaced strips 2, preferably composed of spring steel curved to conform to the contour of the wearer's back and enclosed in suitable casings formed either in the body itself or by separate webbing applied thereto.

The body 1 is formed with upstanding side walls 3 and 4 which respectively terminate in side flaps 5 and 6, while the longitudinal extremities of the body are provided with a top end wall 7 and the bottom end wall 8. The end wall 7 terminates in a top flap 9 and within the body immediately adjacent the top end wall 7 I provide fold retaining corner flaps 10 and 11, hereinafter referred to more in detail.

The opposite end B of the body 1 forms the seat portion of the combined seat and container and also provides a canopy retarding pocket 12. As will be seen from Figure 1, the pocket 12 comprises a front wall 13 stitched to the side walls 3 and 4 along a portion of each of its side edges as at 14, the remaining portions of said side edges being provided with suitable fastening components 15 adapted to detachably engage complementary components 16 on the adjacent side walls of the pocket. The fasteners 15, 16, are preferably of the snap action type to facilitate the closing of the pocket when packing the parachute and the opening of the upper portion of the pocket when the parachute unfolds, as will be later described.

The free extremity of the pocket wall 13 extends beyond the boundary of the pocket and forms a flap 17 which when closed, overlies the lower portion of the folded parachute.

In the preferred form of my invention, the pocket 12 is divided transversely into two parachute fold-receiving compartments, by a separator 18 which consists of a sheet of the body material stitched along one edge across the bottom of the pocket but normally free along its top and side edges. However, for the purpose of properly retaining the folded parachute, I provide complementary snap fasteners 19 and 20 respectively, at the free corners of the separator and the adjacent side walls of the pocket.

In the upper portion of the body 1, I secure conventional shroud line retainers 21 at suitably spaced points on the inner faces of the opposed side walls 3 and 4. These retainers may be in the form of elastic loops in which the folded portions of the shroud lines of the parachute are releasably retained in the usual manner.

In Figure 2 of the drawings, I have shown the container in its closed position. After the parachute has been properly folded and packed, as will be referred to more in detail later on, the top flap 9 is folded inwardly and overlies the upper portion of the folded parachute, after which the lower flap 17, integral with the front wall 13 of the pocket, is similarly folded to overlie the lower folds of the parachute. The central portion of the top flap 9, in relatively close proximity to the free edge thereof, is provided with a locking device 22 adapted to project through registering complementary grummets 23 and 24 in the overlapping edges of the side flaps 5 and 6, respectively. The central upper portion of the lower flap 17 is provided with a similar locking device 25 which projects through registering complementary grummets 26 and 27 in said side flaps 5 and 6 respectively. Intermediate the grummets 23 and 26 on the edge of the side flap 5, I provide a pair of similar locking members 28 which project through complementary grummets 29 in the adjacent edge of the side flap 6 when both flaps are folded. As shown in Figure 2, each of the locking devices 22, 25, and 28 is provided with the usual transverse apertures 30, aligned longitudinally to receive the ripcord 31 which prevents the flaps of the container from opening until said ripcord is withdrawn from the locking devices.

As a protection for the ripcord and locking devices, I preferably provide along the free edge of the side flap 6, an auxiliary protecting flap 32 which is adapted to be folded over the ripcord and locking devices and secured in closed position by complementary snap fasteners 33 and 34 on the underlying portion of flap 6. This flap 32, while protecting the covered parts, is unsecured at both extremities and thereby permits the free withdrawal of the ripcord 31 when the container is to be opened.

In order to facilitate the immediate opening of the container and to insure the orderly release of the parachute, I provide a plurality of elastic straps 35 which are adapted to encircle the closed container, as shown in Figures 1 and 2, said straps being provided at their opposite extremities with hooks 36 adapted to engage complementary eyelets 37, fastened adjacent the overlapping edges of the respective side flaps 5 and 6. The side flaps are thus maintained under a constant outward tension so that immediately upon release of the locking devices 22, 25 and 28 by withdrawal of the ripcord 31, the elastic straps 35 automatically pull the side flaps 5 and 6 to their open positions, as shown in Figure 1. As shown in Figure 3, these elastic straps 35 are preferably inserted through suitably stitched webbing 38 on the outer face of the back of the container, which permits freedom of movement but retains the straps in place on the container.

Figure 3 also illustrates one means for facilitating the longitudinal adjustment of the length of the container relative to the back of the wearer. Straps 39 and 40 may be stitched to the container at suitable points, adjacent the edges of the webbing 38 and by means of buckles 41, the length of the container may be adjusted.

It will thus be seen that my improved combination seat and parachute pack container comprises an elongated relatively shallow container body, one wall of the upper portion A of which is transversely curved to comfortably fit the back of the wearer, the lower portion B serving as a seat proper. When in use, the seat portion B is bent at substantially right angles along the line c—c (Figure 3), so as to conveniently fit the adjacent portions of the wearer's body when assuming a sitting position, the container being fastened to the wearer's body by conventional harness 42. If desired, the end of the seat portion B may be transversely reinforced by means of a cross strip of metal 43, as will be seen in dotted lines in Figure 3.

The parachute for use in connection with my improved assembly, comprises a more or less conventional canopy 44 to the outer edge of which are suitably secured a series of shroud lines 45, the opposite ends of said shroud lines being connected in the usual manner to the container body. At the apex of the canopy I provide an improved, automatically expanding and contracting vent 46 which is preferably bounded by a hem or collar portion 47, provided with a series of annular stitches 48 for purposes of reinforcement. At suitable points around the collar 47, I secure the extremities of suspension lines 49 and shock cords 50 respectively, each of which normally extends in a straight line across the vent and bisects the circle formed by the vent. The suspension lines 49 and shock cords 50 may be arranged and secured to the collar 47 at alternate points, as shown in Figure 12.

The suspension lines 49 are preferably formed as continuations of the shroud lines 45 as will be seen from Figure 13 and are composed of nylon cords of suitable strength and construction, while the shock cords 50 consist of elastic cords having the required degree of elasticity to normally retain the vent 46 in a predetermined retracted position, such as shown in Figure 11, but capable of being elongated to the fully extended position of the vent, as shown in Figure 12.

Although various methods may be employed for securing the ends of the suspension lines and shock cords to the collar 47 of the vent, my preferred method is illustrated in detail in Figures 14 and 15. Here it will be seen that a strip of the suspension line material is looped as at 51 providing a pair of spaced parallel legs to be stitched to the collar 47 and the body of the parachute. The respective suspension lines 49 are interposed between the legs of the loops and the assembly is stitched together and to the parachute body as shown at 52 in Figure 14. To each of the loops 51, I secure the ends of respective shock cords 50 by threading the end of the shock cord through the loop and serving with wire or thread as at 53. This arrangement wherein the shock cords and suspension lines of each set are anchored to the collar at a common point, provides a strong and durable connection which more adequately distributes the stresses and strains on the collar and is relatively simple in construction.

Any suitable pilot chute 54 may be connected by lines 55 at the point of intersection of the suspension lines 49, as will be seen from Figure 13, this connection being such as to permit complete freedom of operation of the resilient shock cords 50, during the descent of the parachute.

Turning now to Figure 4, it will be seen that in packing the canopy, the skirt 56 thereof is first folded and inserted in the pocket 12 beneath the separator 18 and the separator is snapped in closed position by means of fasteners 19 and 20. The body of the canopy is then transversely folded upon itself in a zigzag fashion with the first of the lower folds 57 inserted in the pocket 12 between the separator 18 and the outer wall 13 of the pocket, the apex of the canopy being folded under, as at 58 with the pilot chute 54 lying on top of the folded canopy. The pocket flap 17 is then placed over the lower folds of the canopy and the snap fasteners 15, 16, secured.

The supplemental fold retaining flaps 10 and 11, adjacent the upper portion of the container are then snapped in closed position over the edges of the upper folds of the canopy and the top flap 9 is folded to overlie the canopy. The side flap 5 is then folded inwardly over the folded canopy which brings the locking devices 22 and 25 of the end flaps, and 28 of the side flap 5, into alignment to register with the respective grummets 24, 27 and 29 when the side flap 6 is folded to overlie the side flap 5, as shown in Figure 2.

The ripcord 31 is then threaded through respective openings 30 in the locking devices and the protecting flap 32 is snapped in closed position by fasteners 33, 34, to cover the ripcord 31 and the locking devices. The elastic bands 35 are then stretched around the container and their hooks 36 are secured in respective eyelets 37. The packed parachute and container are now ready to be secured to the body of a pilot or other wearer by means of the harness 42, the wearer sitting on the seat portion B with his back resting against the back support A.

The opening sequence of my improved parachute and container are as follows, and will be more readily understood by reference to Figures 4 to 13.

When the ripcord 31 is pulled, the locking devices 22, 25 and 28 are freed and the elastic bands 35 immediately pull the flaps 5 and 6 into the open position shown in Figure 4, exposing the pilot chute 54. The pilot chute fills with air and pulls the first length of the folded canopy from the container, as shown in Figure 5, the first lower fold 57 of the canopy being retarded to the desired extent by means of the pocket 12, as shown in Figure 6. The canopy then continues to stretch out in a straight line until only its skirt 56 is retained in the pocket 12 beneath the separator 18, as shown in Figure 7.

Up to this point, it will be observed that no air has been permitted to enter the canopy, the elastic shock cords 50 retaining the vent 46 in its fully retracted position, as shown in Figure 11. The continued withdrawal of the canopy removes the skirt 56 from the pocket 12, whereupon the canopy begins to fill with air and the suspension lines 45 which have been folded in zigzag fashion and retained in the resilient retainers 21, are progressively withdrawn from the container, as shown in Figures 8 to 10.

Upon initial opening of the canopy, the vent 46 becomes fully expanded to the position shown in Figure 13, with the elastic shock cords and the suspension lines drawn taut across the vent. The canopy is thus permitted to gather air during a high speed escape, but releasing the larger portion of the captured air through the expanded vent and thereby reducing pressures within the canopy to effect a gradual deceleration without excessive strain on the wearer or the parachute. As the deceleration continues, the pressures within the canopy are progressively reduced and the vent automatically retracts in diameter through the action of the resilient shock cords 50, until said vent has assumed its normal size and a normal rate of descent is attained. It will be observed that the complete cycle of this process is executed in a matter of a very few seconds.

It is believed that the advantages of my improved equipment will be apparent. By providing a container which so regulates the unfolding sequence of the canopy as to prevent the entrance of air until the canopy is fully extended, I am enabled to retard the opening of the canopy until the proper time and by the provision of my improved automatic vent, I reduce the shock which would normally be caused by the initial opening of the canopy and thereby minimize strain both upon the parachute itself, and the wearer.

From the foregoing, it is believed that my invention may be readily understood by those skilled in the art without further description, it being borne in mind that numerous changes may be made in the details of structure without departing from the spirit of the invention as set forth in the following claims.

I claim:

1. A parachute comprising a canopy having a variable vent opening, a reinforced collar bounding said opening, a series of non-yielding suspension lines secured to said collar and extending across said vent opening for limiting its maximum flow capacity, and yielding means operatively associated with said collar for normally holding said opening to a minimum flow capacity throughout a substantial range of decelerating force, said means being adapted to yield upon a predetermined increase of such force to increase the flow capacity of said vent opening, and by recoil, to again restrict said opening to reduce its flow capacity as the decelerating force increases.

2. A parachute comprising a canopy, having a variable vent opening, a reinforced collar bounding said opening and yielding tie elements extending across the vent opening and anchored at spaced points around said collar, said tie elements normally holding the opening to a minimum flow capacity throughout a substantial range of decelerating force, and being adapted to yield upon a predetermined increase of such force to increase the flow capacity of said vent opening, and by recoil, to again restrict said opening to reduce its flow capacity as the decelerating force increases, and a series of non-yielding suspension lines secured to said collar at spaced points and extending across said vent for limiting its maximum flow capacity.

3. A parachute as claimed in claim 2, said series of suspension lines secured to said collar and extending across said vent opening in alternate relation to said yielding tie elements, for limiting the maximum flow capacity of said vent opening.

4. A parachute comprising a canopy having a variable vent opening, a reinforced collar bounding said opening, a series of suspension lines secured to said collar at spaced points and extending across said vent opening for limiting its maximum flow capacity, a pilot chute secured to said suspension lines, and yielding means comprising a series of resilient cross tie elements anchored to said collar at said spaced points for normally holding said opening to a minimum flow capacity throughout a substantial range of decelerating force, said means being adapted to yield upon a predetermined increase of such force to increase the flow capacity of said vent opening, and by recoil, to again restrict said opening to reduce its flow capacity as the decelerating force increases.

CHARLES E. THOMPSON.

REFERENCES CITED

The following references are of record in the file of this patent:

UNITED STATES PATENTS

| Number | Name | Date |
| --- | --- | --- |
| 1,403,983 | Smith | Jan. 17, 1922 |
| 1,498,780 | Broadwick | June 24, 1924 |
| 1,811,050 | Hoffman | June 23, 1931 |
| 2,052,503 | Tricau | Aug. 25, 1936 |
| 2,214,569 | Willing | Sept. 10, 1940 |
| 2,337,168 | Smith | Dec. 21, 1943 |
| 2,350,646 | Smith | June 6, 1944 |
| 2,356,493 | Smith | Aug. 22, 1944 |

FOREIGN PATENTS

| Number | Country | Date |
| --- | --- | --- |
| 361,431 | Italy | July 21, 1938 |